United States Patent [19]
Kim

[11] Patent Number: 5,814,977
[45] Date of Patent: Sep. 29, 1998

[54] POWER SUPPLY FOR COMPENSATING A FAILED VOLTAGE

[75] Inventor: Ji-Hyeon Kim, Seoul, Rep. of Korea

[73] Assignee: Daewoo Electronics Co., Ltd., Seoul, Rep. of Korea

[21] Appl. No.: 555,355

[22] Filed: Nov. 8, 1995

[30] Foreign Application Priority Data

Dec. 29, 1994 [KR] Rep. of Korea ................. 1994-38626

[51] Int. Cl.$^6$ .............................. G05F 1/577; H02J 1/10
[52] U.S. Cl. ............................................. 323/267; 307/24
[58] Field of Search .................................. 323/267, 268,
323/269; 307/18, 23, 24, 28, 38, 39, 82

[56] References Cited

U.S. PATENT DOCUMENTS 3,743,924  7/1973  Genuit ..................................... 323/271
3,796,890  3/1974  Thompson et al. ........................ 307/24
4,034,232  7/1977  LaVenture ................................ 307/32
4,074,182  2/1978  Weischedel .............................. 323/25
5,208,485  5/1993  Krinsky et al. .......................... 323/267

*Primary Examiner*—Matthew V. Nguyen
*Attorney, Agent, or Firm*—Pennie & Edmonds, LLP

[57] ABSTRACT

A power supply capable of compensating a failed voltage occurred therein includes an exclusive OR gate for performing an exclusive OR operation on a first and a second voltages to produce a failure detection signal to indicate a failure in either of a first or a second voltage source, wherein a level of the first voltage is higher than that of the second voltage, a voltage conversion device for converting the first voltage applied thereto to an equivalent to the second voltage and a switching transistor, in response to the failure detection signal, for permitting the first voltage to apply the voltage conversion device.

6 Claims, 1 Drawing Sheet

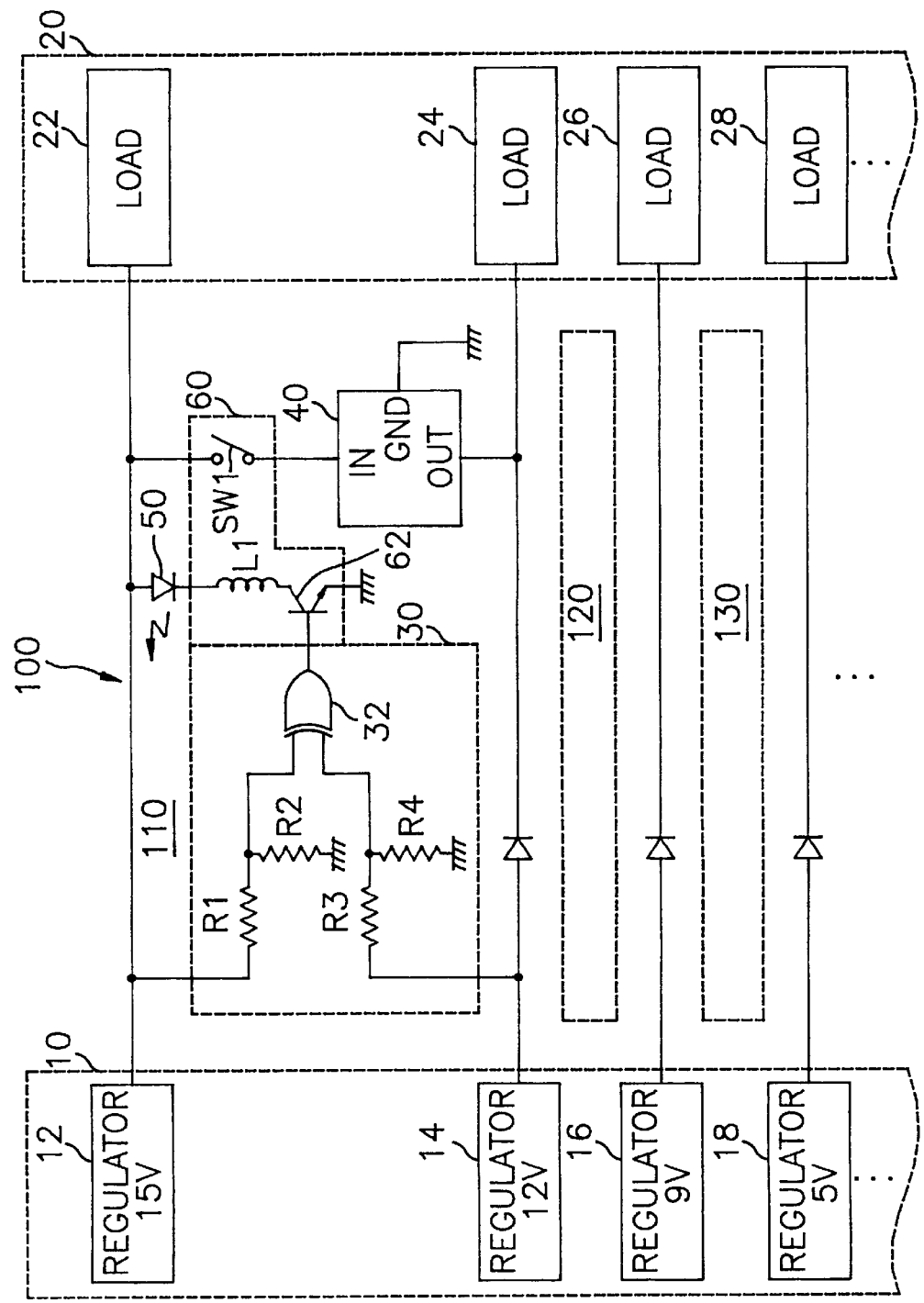

POWER SUPPLY FOR COMPENSATING A FAILED VOLTAGE

FIELD OF THE INVENTION

The present invention relates to a power supply; and, more particularly, to an improved power supply capable of compensating a failed voltage that has occurred therein.

DESCRIPTION OF THE PRIOR ART

In general, an electronic/electrical application requires a power supply for rectifying an ac input to supply a dc operating voltage. The power supply normally includes one or more voltage sources, e.g., regulators which generate different stable dc voltages to activate their respective corresponding loads. Typically, such a regulator is constructed with a zener diode and a power transistor as the main components and is available in the form of an integrated circuit (IC). The regulator IC has a characteristic sensitive to an overheating or overcurrent which may cause the regulator IC to break down. In a prior art power supply having a plurality of regulator ICs, when a failure occurs in any one of the regulator ICs so that the failed regulator IC does not generate a dc voltage, there is normally no means available for compensating a failed voltage occurred from the failed regulator IC; and, further, it is difficult to locate the failure in the plurality of regulator ICs without separately examining each of the regulator ICs through the use of a testing device.

SUMMARY OF THE INVENTION

It is, therefore, an object of the present invention to provide an improved power supply capable of compensating a failed voltage occurred therein.

It is another object of the invention to provide an improved power supply capable of monitoring the occurrence of a failed voltage at its source.

In accordance with one aspect of the present invention, there is provided an improved power supply capable of compensating a failed voltage occurred therein, wherein the power supply comprises:

a plurality of voltage sources arranged in a descending order by their voltage capacity; and an arrangement having a plurality of voltage compensation blocks, each of the voltage compensation blocks being intercalated between a pair of voltage sources in such a way that each voltage compensation block connects a first voltage source in the pair to a second voltage source in the pair, the first voltage source generating a first voltage needed to activate its corresponding first load and the second voltage source generating a second voltage needed to activate its corresponding second load and a level of the first voltage being higher than that of the second voltage, wherein said each of the voltage compensation blocks includes:

means for detecting a failure in either the first or the second voltage source to produce a failure detection signal;

means, connected between an output of the first voltage source and the second load, for converting the first voltage to an equivalent to the second voltage needed to activate the second load; and means, connected between the output of the first voltage source and the converting means and in response to the failure detection signal, for applying the first voltage to the converting means.

In another aspect of the present invention, there is provided an improved power supply capable of compensating a failed voltage occurred therein, wherein the power supply comprises:

a first voltage source for generating a first voltage needed to activate a first load;

a second voltage source for generating a second voltage needed to activate a second load, the first voltage being higher than the second voltage;

means for detecting a failure in either the first or the second voltage source to produce a failure detection signal;

means, connected between the output of the first voltage source and the second load, for converting the first voltage to an equivalent to the second voltage; and means, connected between the output of the first voltage source and the converting means and in response to the failure detection signal, for applying the first voltage to the converting means, to thereby compensate the voltage failure occurred in the second voltage source from the first voltage source.

BRIEF DESCRIPTION OF THE DRAWING

The above and other objects and features of the present invention will become apparent from the following description of preferred embodiments, when taken in conjunction with the accompanying drawing, which is a circuit diagram, partially in a block form, of an improved power supply in accordance with the present invention.

DETAILED DESCRIPTION OF THE PREFERRED EMBODIMENTS

Referring to the drawing, there is shown an improved power supply in accordance with the invention. The improved power supply comprises a voltage source section 10, a load section 20 and a voltage compensation arrangement 100 between the voltage source section 10 and the load section 20.

The voltage source section 10 includes a plurality of voltage sources, i.e., regulators 12, 14, 16 and 18, which generate different dc operating voltages, e.g., 15V, 12V, 9V and 5V and are arranged in a descending order by their voltage capacity. The dc operating voltages generated from the regulators are applied to the load section 20 so as to activate the loads 22, 24, 26 and 28 in the load section 20, respectively.

The voltage compensation arrangement 100 is represented to include a series of voltage compensation blocks 110 through 130; and only one 110 among them is specifically shown in the drawing. Each of the voltage compensation blocks is intercalated between a pair of voltage sources in such a way that each voltage compensation block connects a first voltage source in the pair to a second voltage source in the pair. For example, the voltage compensation block 110 is provided between a pair of regulators 12 and 14 and a pair of loads 22 and 24, the voltage compensation block 120 is provided between a pair of regulators 14 and 16 and a pair of loads 24 and 26 and so on. The voltage compensation block 110 includes a failure detector 30, a voltage conversion device 40 and a switching circuit 60.

The failure detector 30 detects a failure in either of a first or a second regulator 12 or 14 by monitoring the occurrence of a voltage failure in the first and the second voltage regulators 12 and 14. The failure detector 30 includes a first voltage divider having resistors R1 and R2 and a second voltage divider having resistors R3 and R4; and an exclusive OR ("EX-OR") gate 32. These voltage dividers are well known in the art; and, therefor, will not be discussed in detail. The EX-OR gate 32 performs an logical exclusive OR operation on the first voltage through the first voltage divider R1, R2 and the second voltage through the second voltage divider R3, R4 to produce a failure detection signal representing the presence of a failed regulator.

The voltage conversion device 40, which is connected between the output of the first regulator 12 and the input of the second load 24, serves to convert the level of the first voltage, e.g., 15V into an equivalent value corresponding to the level of the second voltage, e.g., 12V, needed to activate the second load 24. The voltage conversion device 40 may be implemented with a conventional regulator as shown.

The switching circuit 60 includes a switching transistor 62 having the base connected to the output of the EX-OR gate 32, the emitter connected to the ground and the collector connected to the output of the first regulator 12; and a relay circuit having a relay coil L1 and a relay switch SW1 through which the first voltage from the regulator 12 is selectively applied to the voltage conversion device 40 under the switching action of the switching transistor 62.

The voltage compensation block 110 further comprises a indicator lamp 50 to indicate the occurrence of the failed regulator, which is of a light emitting diode connected between the output of the first regulator 12 and the collector of the transistor 62.

The operation of the improved power supply having the voltage compensation arrangement will be described hereinbelow.

When both of the first and the second regulators 12 and 14 are normally operated, each of them generates first and second voltages, respectively. The first voltage is applied via the first voltage divider as a logic high signal to a first input of the EX-OR gate 32. Similarly, the second voltage is applied via the second voltage divider as a logic high signal to a second input of the EX-OR gate 32. Accordingly, the output of the EX-OR gate 32 becomes a logic low which turns off the transistor 62. At the same time, the light emitting diode 50 remains in the turned-off state to indicate the normal state of both the first and the second regulators 12 and 14.

However, in case where the first regulator 12 is normal while the second regulator 14 fails to make its corresponding load 24 inoperative, a logic high signal is provided to the first input of the EX-OR gate 32 while a logic low signal is applied to the second input of the EX-OR gate 32. Accordingly, the EX-OR gate produces a logic high signal as a failure detection signal. The failure detection signal is then provided to the transistor 62. In response to the failure detection signal, the transistor 62 becomes turned on and, in turn, an electrical current flows to the relay coil L1, to thereby close the relay switch SW1. Consequently, the first voltage generated from the first regulator 12 is applied to the input of the voltage conversion device 40 through the relay switch SW1. At the voltage conversion device 40, the value of the first voltage is converted into the value of the second voltage needed to operate the second load 24. At the same time, the light emitting diode 50 is in a turned-on state to indicate an abnormal state of the second regulator 14.

Alternatively, in case where the second regulator 14 is normal to produce the second voltage while the first regulator 12 is failed and does not supply the first voltage, the EX-OR gate 32 also generates a logic high signal as the failure detection signal, but the voltage conversion device 40 will not produce its output voltage because of the absence of the voltage supplied thereto from the first regulator 12.

As described above, with this arrangement, in case where a failed voltage source in a power supply does not generate a required voltage to its load, the failed voltage is compensated with an upper level of voltage which is generated from another voltage source so that the load can be operated without interruption, to thereby improve the efficiency of the power supply.

Although the present invention has been shown and described with respect to the particular embodiments only, it will be apparent to those skilled in the art that many changes and modifications may be made without departing from the spirit and scope of the present invention as defined in the appended claims.

What is claimed is:

1. A power supply capable of compensating a failed voltage occurred therein, which comprises:

a plurality of voltage sources arranged in a descending order by their voltage capacity; and an arrangement having a plurality of voltage compensation blocks, each of the voltage compensation blocks being intercalated between a pair of voltage sources in such a way that each voltage compensation block connects a first voltage source in the pair to a second voltage source in the pair, the first voltage source generating a first voltage needed to activate its corresponding first load and the second voltage source generating a second voltage needed to activate its corresponding second load and a level of the first voltage being higher than that of the second voltage, wherein said each of the voltage compensation blocks includes:

means for detecting a failure in either the first or the second voltage source to produce a failure detection signal;

means, connected between an output of the first voltage source and the second load, for converting the first voltage to an equivalent to the second voltage needed to activate the second load; and means, connected between the output of the first voltage source and the converting means and in response to the failure detection signal, for applying the first voltage to the converting means.

2. The power supply of claim 1, wherein the detection means includes a first voltage divider and a second voltage divider and an exclusive OR gate for performing an logical exclusive OR operation on the first voltage through the first voltage divider and the second voltage through the second voltage divider to produce the failure detection signal.

3. The power supply of claim 2 further comprising:

means, connected between the output of the first voltage source and the applying means, for indicating the failure of the second voltage source when the first voltage is supplied to the converting means through the applying means.

4. A power supply capable of compensating a failed voltage occurred therein, which comprises:

a first voltage source for generating a first voltage needed to activate a first load;

a second voltage source for generating a second voltage needed to activate a second load, a level of the first voltage being higher than that of the second voltage;

means for detecting a failure in either the first or the second voltage source to produce a failure detection signal;

means, connected between the output of the first voltage source and the second load, for converting the first voltage to an equivalent to the second voltage; and means, connected between the output of the first voltage source and the converting means and in response to the failure detection signal, for applying the first voltage to the converting means, to thereby compensate the voltage failure occurred in the second voltage source from the first voltage source.

5. The power supply of claim 4, wherein the detection means includes a first voltage divider and a second voltage divider and an exclusive OR gate for performing an logical exclusive OR operation on the first voltage through the first voltage divider and the second voltage through the second voltage divider to produce the failure detection signal.

6. The power supply of claim 5 further comprising:

means, connected between the output of the first voltage source and the applying means, for indicating the failure of the second voltage source when the first voltage is supplied to the converting means through the applying means.

* * * * *